United States Patent
Tooyama et al.

(10) Patent No.: US 8,520,637 B2
(45) Date of Patent: Aug. 27, 2013

(54) MOBILE COMMUNICATION SYSTEM, NETWORK DEVICE, AND MOBILE COMMUNICATION METHOD

(75) Inventors: Hiroto Tooyama, Yokosuka (JP); Yoshifumi Morihiro, Shinagawa-ku (JP); Kouji Makino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 270 days.

(21) Appl. No.: 13/091,764

(22) Filed: Apr. 21, 2011

(65) Prior Publication Data

US 2011/0317658 A1    Dec. 29, 2011

(30) Foreign Application Priority Data

Apr. 21, 2010 (JP) ............... P2010-098183

(51) Int. Cl.
*H04W 4/00* (2009.01)
*H04W 36/14* (2009.01)

(52) U.S. Cl.
USPC ......................................... 370/331; 370/341

(58) Field of Classification Search
None
See application file for complete search history.

(56) References Cited

U.S. PATENT DOCUMENTS

| | | | |
|---|---|---|---|
| 2009/0109924 A1* | 4/2009 | Sato | 370/331 |
| 2009/0193310 A1 | 7/2009 | Hashimoto | |
| 2009/0257398 A1* | 10/2009 | Koyanagi et al. | 370/331 |
| 2009/0285183 A1* | 11/2009 | Wu et al. | 370/331 |
| 2010/0008324 A1* | 1/2010 | Lee et al. | 370/331 |
| 2010/0128649 A1* | 5/2010 | Gonsa et al. | 370/312 |
| 2010/0278142 A1* | 11/2010 | Dwyer et al. | 370/331 |
| 2011/0032909 A1* | 2/2011 | Park et al. | 370/332 |
| 2011/0090790 A1* | 4/2011 | Bergqvist et al. | 370/230 |
| 2011/0096660 A1* | 4/2011 | Ikeda et al. | 370/225 |

FOREIGN PATENT DOCUMENTS

| | | |
|---|---|---|
| JP | 2008-41329 | 2/2008 |
| JP | 2008-236269 | 10/2008 |
| WO | WO2008/041329 | 4/2008 |

* cited by examiner

*Primary Examiner* — Chi Pham
*Assistant Examiner* — Soon-Dong D Hyun
(74) *Attorney, Agent, or Firm* — Oblon, Spivak, McClelland, Maier & Neustadt, L.L.P.

(57) ABSTRACT

A mobile communication system having a first communication system and a second communication system forwards forwarding data from the first communication system to the second communication system when switching from the first communication system to the second communication system is determined, the forwarding data being a data that the first communication system has already received from a core network device. A network device transmitting direct data to a mobile communication terminal via the second communication system is configured to count the number of switching times that the switching from the first communication system to the second communication system has been determined, for every user. The network device is configured to count the number of successful reception times that information identifying a user has been received via a forwarding path of the forwarding data, for every user. The network device is configured to judge whether the forwarding path of the forwarding data is normal or not on the basis of a ratio between the number of switching times and the number of successful reception times.

6 Claims, 4 Drawing Sheets

MOBILE COMMUNICATION SYSTEM, NETWORK DEVICE, AND MOBILE COMMUNICATION METHOD

This application is based upon and claims a priority from the prior Japanese patent application No. 2010-098183, filed on Apr. 21, 2010, entire contents of which are incorporated herein by reference.

BACKGROUND OF THE INVENTION

1. Field of the Invention

The present invention relates to a mobile communication system including a first communication system and a second communication system, a network device provided in a mobile communication system, and a mobile communication method.

2. Description of the Related Art

An Inter-RAT handover is known as a procedure for a mobile communication terminal (UE) to switch from the connection with a first communication system (first Radio Access Technology (RAT)) to that with a second communication system (second RAT) in a mobile communication system.

With respect to the Inter-RAT handover, a technology (Forwarding technology) is known in which data (packet) having been already received by the first communication system is forwarded from the first communication system to the second communication system when switching (Path Switch) from the first communication system to the second communication system is determined (for example, Japanese Patent Application Publication No. 2008-041329 and Japanese Patent Application Publication No. 2008-236269).

Moreover, with respect to the Inter-RAT handover, a technology (Reordering technology) is known in which data forwarded from the first communication system (hereinafter, forwarding data) and data which the second communication system directly receives from a core network (hereinafter, direct data) are reordered.

In the Inter-RAT handover, an end marker indicating the last forwarding data forwarded from the first communication system is used. The second communication system is configured to start transmission of the direct data when the end marker is forwarded from the first communication system.

A path through which the forwarding data is forwarded between the first communication system and the second communication system is not a control plane (C-PLANE) but a user plane (U-PLANE).

The first communication system (transmission side) can acquire an IP address and a PORT number of a device provided in the second communication system (reception side). Thus, the first communication system can detect whether the forwarding path of the forwarding data is normal or not by transmitting a packet requesting a reply (for example, ECHO packet) to the second communication system.

However, the second communication system (reception side) cannot acquire an IP address and a PORT number of a device provided in the first communication system. Thus, the second communication system cannot transmit the packet requesting a reply (for example, ECHO packet) to the first communication system, and cannot detect whether the forwarding path of the forwarding data is normal or not.

SUMMARY OF THE INVENTION

A mobile communication system according to a first aspect has a first communication system and a second communication system, and forwards forwarding data from the first communication system to the second communication system when switching from the first communication system to the second communication system is determined, the forwarding data being a data that the first communication system has already received from a core network device. A network device transmitting direct data to a mobile communication terminal via the second communication system is configured to count the number of switching times that the switching from the first communication system to the second communication system has been determined, for every user. The network device is configured to count the number of successful reception times that information identifying a user has been received via a forwarding path of the forwarding data, for every user. The network device is configured to judge whether the forwarding path of the forwarding data is normal or not on the basis of a ratio between the number of switching times and the number of successful reception times.

In the first aspect, the network device is a device which controls a radio resource in the second communication system. The network device is configured to count the number of switching times on the basis of a request for switching from the first communication system to the second communication system or on the basis of a completion of switching from the first communication system to the second communication system, the request for switching being received from the core network device, the completion of switching being received from the mobile communication terminal.

In the first aspect, the network device is the core network device. The network device is configured to transmit the direct data to the first communication system before the switching from the first communication system to the second communication system. The network device is configured to transmit the direct data to the second communication system after the switching from the first communication system to the second communication system. The network device is configured to count the number of switching times on the basis of the number of times an end marker indicating the last forwarding data has been transmitted to the first communication system.

In the first aspect the network device is the core network device. The network device is configured to transmit the direct data to the second communication system after the switching from the first communication system to the second communication system. The network device is configured to forward the forwarding data received from the first communication system, to the second communication system after the switching from the first communication system to the second communication system. The network device is configured to count the number of switching times on the basis of a forward request [作成者1] of the forwarding data received from the first communication system.

A network device according to a second aspect is provided in a mobile communication system having a first communication system and a second communication system configured to forward forwarding data from the first communication system to the second communication system when switching from the first communication system to the second communication system is determined, the forwarding data being a data that the first communication system has already received from a core network device. The network device transmitting direct data to a mobile communication terminal via the second communication system includes: a switching time counter configured to count the number of switching times that the switching from the first communication system to the second communication system has been determined, for every user; a successful reception time counter configured to count the number of successful reception times that information identifying a user has been received via a forwarding path of the forwarding data, for every user; and a controller configured to judge whether the forwarding path of the forwarding data is normal or not on the basis of a ratio between the number of switching times and the number of successful reception times.

A mobile communication method according to a third aspect is used in a mobile communication system having a first communication system and a second communication system configured to forward forwarding data from the first communication system to the second communication system when switching from the first communication system to the second communication system is determined, the forwarding data being a data that the first communication system has already received from a core network device. The mobile communication method including the steps of: counting, by a network device transmitting direct data to a mobile communication terminal via the second communication system, the number of switching times that the switching from the first communication system to the second communication system has been determined, for every user; counting, by the network device, the number of successful reception times that information identifying a user has been received via a forwarding path of the forwarding data, for every user; and judging, by the network device, whether the forwarding path of the forwarding data is normal or not on the basis of a ratio between the number of switching times and the number of successful reception times.

DETAILED DESCRIPTION OF THE EMBODIMENTS

A mobile communication system according to embodiments of the present invention will be described below with reference to the drawings. Note that, in the following description of the drawings, same or similar reference_signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

Outline of Embodiments

A mobile communication system according to the embodiments has a first communication system and a second communication system, and forwards forwarding data from the first communication system to the second communication system when switching from the first communication system to the second communication system is determined, the forwarding data being a data that the first communication system has already received from a core network device. A network device transmitting direct data to a mobile communication terminal via the second communication system is configured to count the number of switching times that the switching from the first communication system to the second communication system has been determined, for every user. The network device is configured to count the number of successful reception times that information identifying a user has been received via a forwarding path of the forwarding data, for every user. The network device is configured to judge whether the forwarding path of the forwarding data is normal or not on the basis of a ratio between the number of switching times and the number of successful reception times.

In the embodiments, the network apparatus judges whether the forwarding path of the forwarding data is normal or not on the basis of the ratio between the number of switching times and the number of successful reception times. Accordingly, whether the forwarding path of the forwarding data is normal or not can be detected on a reception side of the forwarding data.

First Embodiment

Configuration of Mobile Communication System

Figure 1:
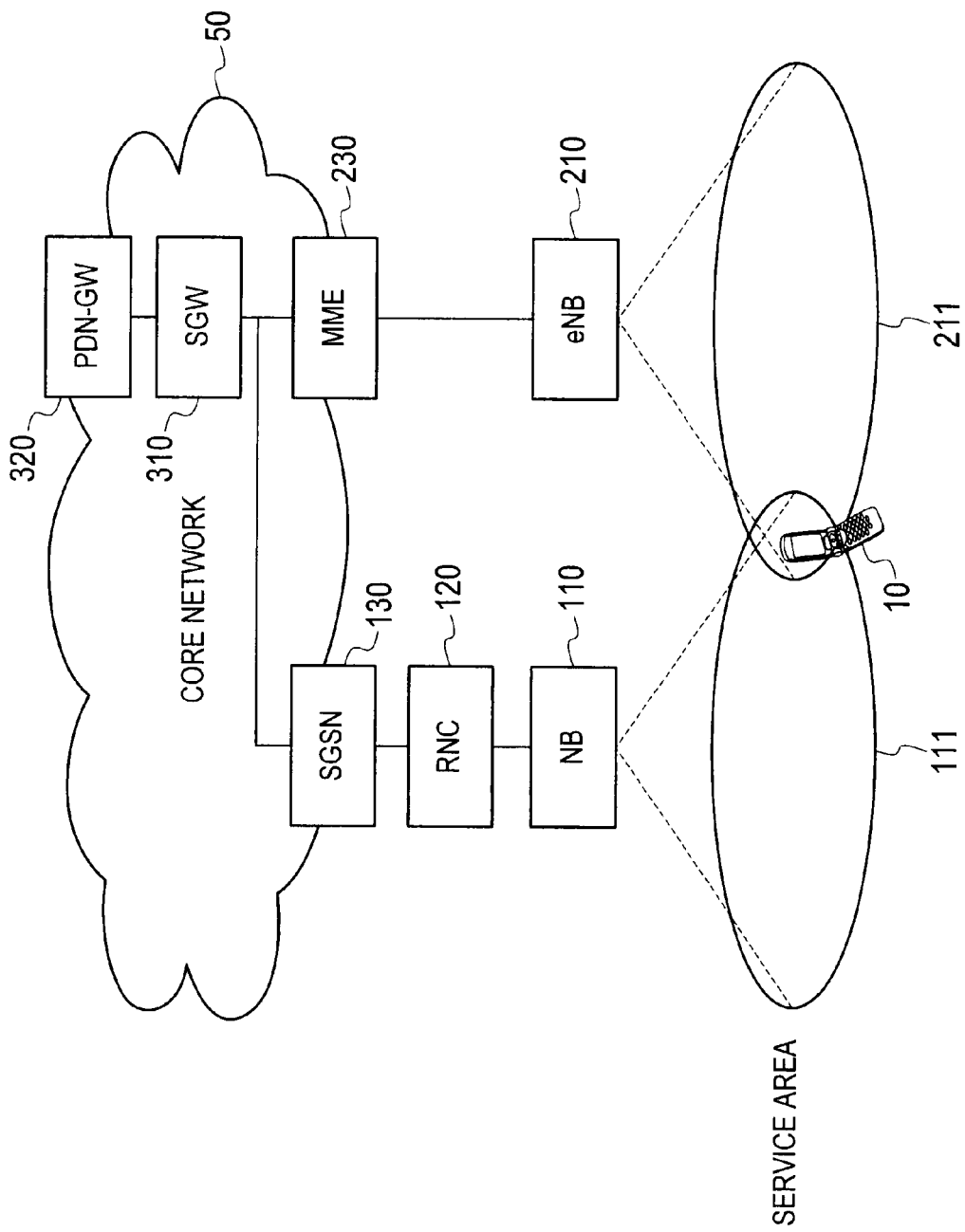
FIG. 1 is a view showing a mobile communication system 100 according to a first embodiment.

A configuration of a mobile communication system according to the first embodiment will be described below with reference to the drawings. FIG. 1 is a view showing a mobile communication system 100 according to the first embodiment.

As shown in FIG. 1, the mobile communication system 100 includes a mobile communication terminal 10 (hereinafter, UE 10) and a core network 50. Moreover, the mobile communication system 100 includes a first communication system and a second communication system.

The first communication system is a communication system complying with, for example, Long Term Evolution (LTE). The first communication system includes, for example, a base station 210 (hereinafter, eNB 210), and a MME 230. Note that, a first Radio Access Technology (RAT) is used in the first communication system.

The second communication system is a communication system complying with, for example, Universal Mobile Telecommunication System (UMTS). The second communication system includes, for example, a base station 110 (hereinafter, NB 110), an RNC 120, and an SGSN 130. Note that, a second Radio Access Technology (RAT) is used in the second communication system.

The UE 10 is a device (User Equipment) configured to perform communication with the first communication system and the second communication system. For example, the UE 10 has a function to perform radio communication with the NB 110 and a function to perform radio communication with the eNB 210.

The NB 110 has a cell 111, and is a device (NodeB) which performs radio communication with the UE 10 in the cell 111.

The RNC 120 is connected to the NB 110, and is a device (Radio Network Controller) which establishes radio connection (RRC Connection) with the UE 10 in the cell 111.

The SGSN 130 is a device (Serving GPRS Support Node) which performs packet switching in a packet switching domain. The SGSN 130 is provided in the core network 50. Although omitted in FIG. 1, a device (MSC; Mobile Switching Center) which performs circuit switching in a circuit switching domain may be provided in the core network 50.

The eNB 210 has a cell 211, and is a device (evolved NodeB) which performs radio communication with the UE 10 in the cell 211.

The MME 230 is a device (Mobility Management Entity) which manages mobility of the UE 10 establishing radio communication with the eNB 210. The MME 230 is provided in the core network 50.

Note that, each of the cells should be understood as a function to perform radio communication with the UE 10. However, the cell may be understood as a service area indicating an area communicatable with the cell. Each cell is identified by a frequency, a spreading code, a time slot, or the like used in the cell.

The core network 50 includes an SGW 310 and a PDN-GW 320.

The SGW 310 is a device (Serving Gateway) which functions as an interface between the first communication system and the second communication system.

Here, the SGW 310 transmits direct data to the first communication system before switching from the first communication system to the second communication system. The SGW 310 transmits the direct data to the second communication system after switching from the first communication system to the second communication system.

The PDN-GW 320 is a device (Packet Data Network Gateway) which functions as an interface between the core network 50 and an external network (for example, WiMAX or the like). The PDN-GW 320 has a function of performing processing of a charge to a user.

In the first embodiment, switching (Inter-RAT handover) from the first communication system to the second communication system will be given as an example. When the Inter-RAT handover is determined, data (packet) having been already received by the first communication system is forwarded from the first communication system to the second communication system (Forwarding technology). In addition, the second communication system reorders forwarding data forwarded from the first communication system and the direct data received from the core network 50 (Reordering technology).

In the first embodiment, the second communication system starts transmission of the direct data when an end marker is forwarded from the first communication system, the end marker indicating that forwarding data forwarded from the first communication system is the last data.

Note that, the forwarding data is forwarded from the first communication system to the second communication system via a user plane (U-PLANE).

(Configuration of Network Device)

Figure 2:
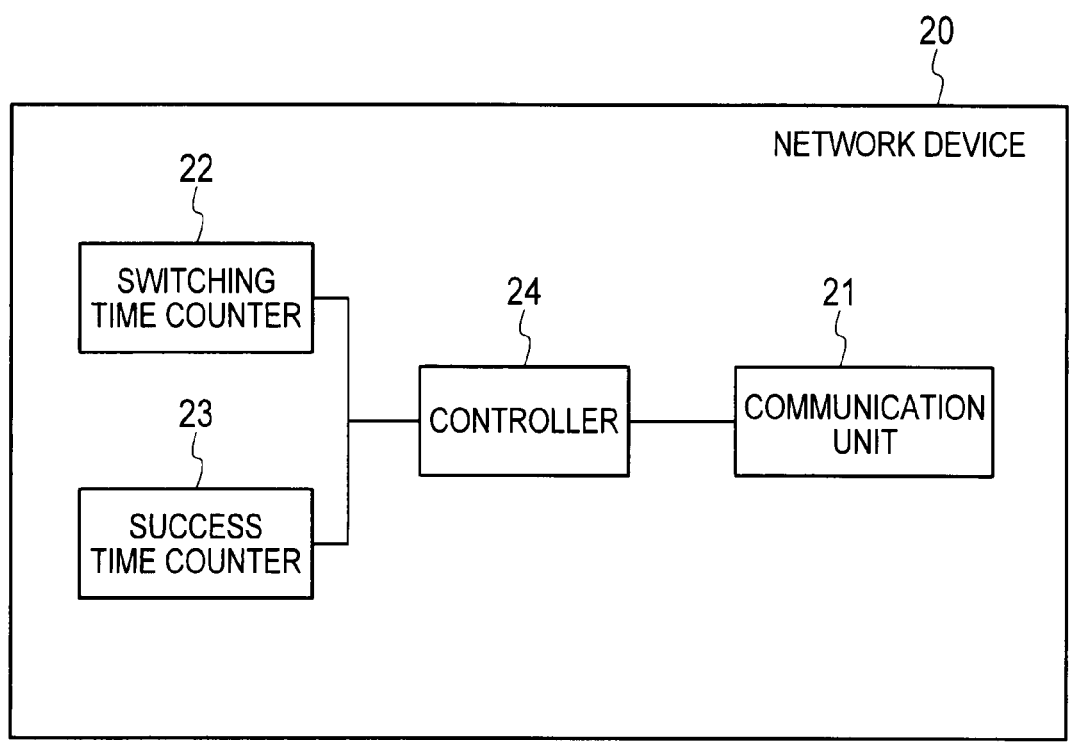
FIG. 2 is a block diagram showing a network device 20 according to the first embodiment.
Figure 3:
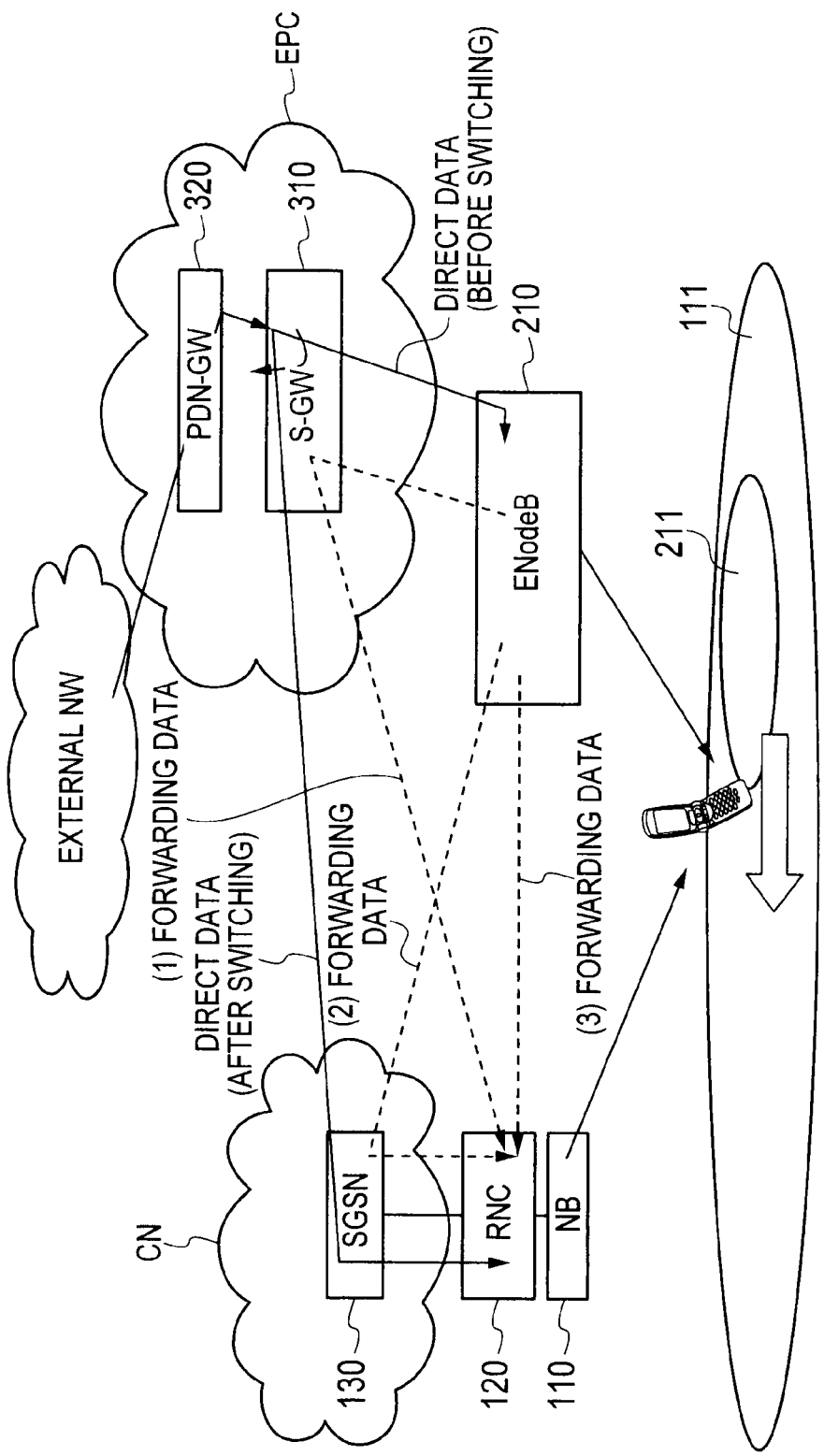
FIG. 3 is a view showing a forwarding path of forwarding data according to Modification 1.
Figure 4:
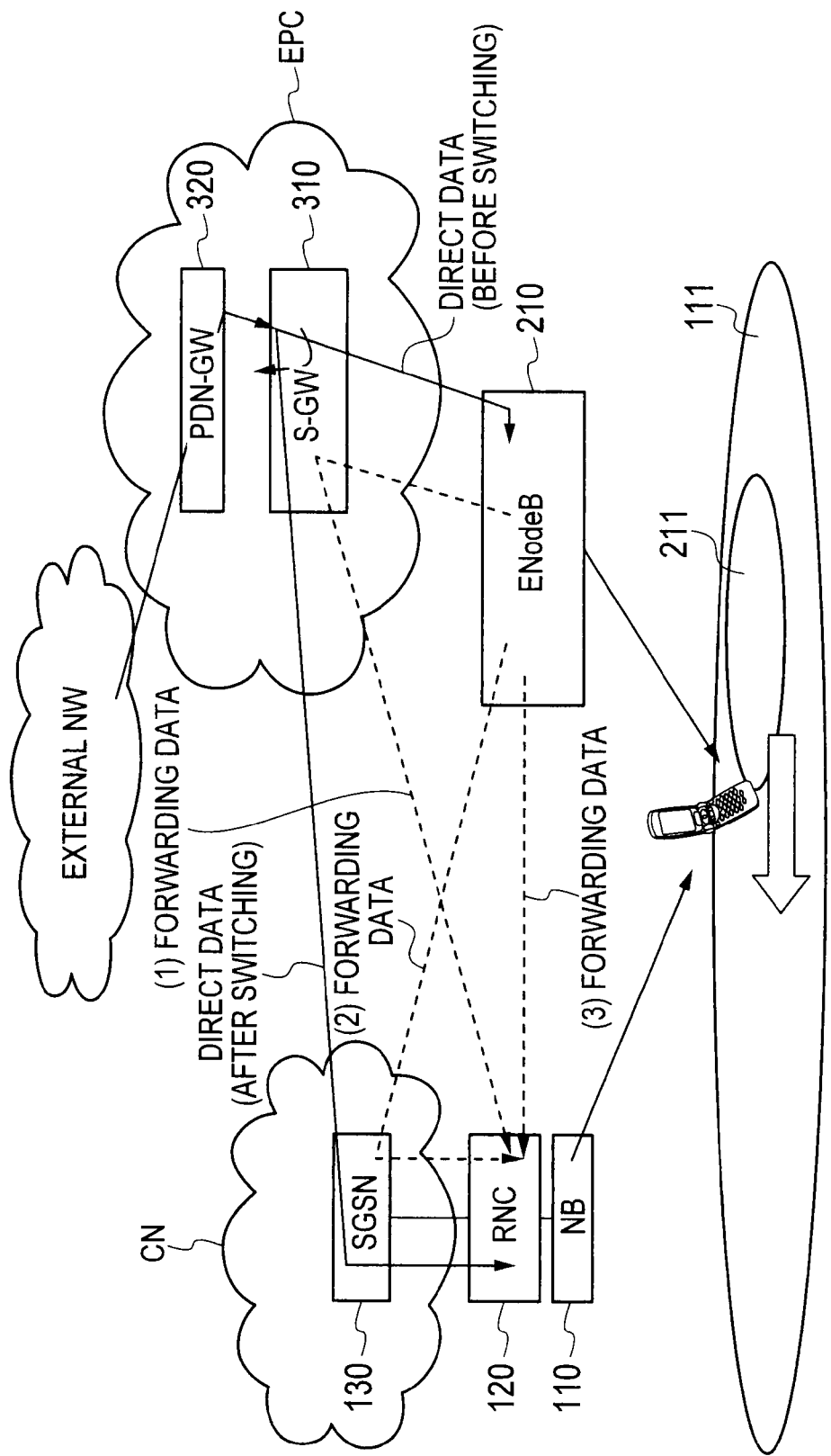
FIG. 4 is a view showing a forwarding path of forwarding data according to Modification 2.

A configuration of a network device according to the first embodiment will be described below with reference to the drawings. FIG. 2 is a diagram showing a network device 20 according to the first embodiment.

In the first embodiment, a network device 20 transmits the direct data to the UE 10 via the second communication system. For example, the network device 20 is the RNC 120. As shown in FIG. 2, the network device 20 includes a communication unit 21, a switching time counter 22, a success time counter 23, and a controller 24.

The communication unit 21 is configured to perform communication with other network devices. For example, the communication unit 21 receives the forwarding data from a network device (for example, eNB 210 or MME 230) provided in the first communication system. Alternatively, the communication unit 21 may receive the forwarding data via the SGSN 130. Instead, the communication unit 21 may receive the forwarding data via a network device (for example, SGW 310) provided in the core network 50. Moreover, the communication unit 21 receives the direct data from a network device (for example, SGW 310) provided in the core network 50.

The communication unit 21 is configured to perform communication with the UE 10. For example, the communication unit 21 transmits the forwarding data to the UE 10. In addition, the communication unit 21 transmits the direct data to the UE 10.

The switching time counter 22 is configured to count the number of switching times that the switching from the first communication system to the second communication system has been determined, for every user.

For example, when the network device 20 is the RNC 120, the switching time counter 22 counts the number of the switching times on the basis of a request for switching (for example, "Relocation Request") from the first communication system to the second communication system, the request for switching being received from the core network 50 (SGSN 130). The request for switching (for example, "Relocation Request") includes information (for example, "Radio Access Bearer (RAB) ID") identifying a user. Alternatively, the switching time counter 22 counts the number of the switching times on the basis of a completion of switching (for example, "Handover to UTRAN Complete") from the first communication system to the second communication system, the completion of switching received from the UE 10. The completion of switching (for example, "Handover to UTRAN Complete") includes information (for example, "Radio Network Temporary Identifier (RNTI)") identifying a user.

The success time counter 23 is configured to count the number of successful reception times that the information identifying a user has been received via a forwarding path of the forwarding data, for every user.

The information identifying a user may be, for example, information (TEID; Tunnel Endpoint Identifier) included in a header of the forwarding data. Alternatively, the information identifying a user may be information (TEID; Tunnel Endpoint Identifier) included in an end marker indicating the last forwarding data.

Here, the number of successful reception times is incremented by "1" for one user. In other words, the success time counter 23 increments the number of successful reception times by "1" even when the information identifying a user is received multiple times from one user.

The controller 24 is configured to control the network device 20. For example, the controller 24 reorders forwarding data forwarded from the first communication system and the direct data received from the core network 50 (Reordering technology).

Here, the controller 24 judges whether the forwarding path of the forwarding data is normal or not on the basis of a ratio between the number of switching times and the number of successful reception times. For example, the controller 24 judges that the forwarding path of the forwarding data is not normal when the ratio of the number of successful reception times to the number of switching times is smaller than a predetermined threshold.

Note that, when the forwarding path of the forwarding data is judged as being not normal, the controller 24 performs the processing described below, for example.

(1) The controller 24 judges that the forwarding path of the forwarding data (U-PLANE) has been disconnected, and disconnects a call of a user using the U-PLANE by using a control plane (C-PLANE) path.

(2) The controller 24 notifies the PDN-GW 320 that the user using the forwarding path of the forwarding data (U-PLANE) is not charged. For example, an amount to be free of charge is calculated in accordance with a period or a packet amount corresponding to the forwarding data which has not been forwarded from the first communication system.

(3) The controller 24 judges that the forwarding path of the forwarding data (U-PLANE) is disconnected, and issues a notification that the U-PLANE is disconnected, by using an operation path managed by an operator.

(Operation and Effect)

In the first embodiment, the network device 20 judges whether the forwarding path of the forwarding data is normal or not, based on the ratio between the number of switching times and the number of successful reception times. Accordingly, whether the forwarding path of the forwarding data is normal or not can be detected on a reception side of the forwarding data.

[Modification 1]

Modification 1 of the first embodiment will be described below with reference to the drawings.

Differences from the first embodiment will be mainly described below.

In the first embodiment, an example has been given of the operation of the RNC 120 when switching from LTE to UMTS is performed. Operations of network devices when switching from LTE to UMTS is performed will be described for each of forwarding paths of forwarding data.

(1) eNB 210 to SGW 310 and then to RNC 120

In such case, the network device 20 described above is a RNC 120 or a SGW 310. Since a case where the network device 20 is the RNC 120 is the same as the case of the first embodiment, description thereof is omitted.

A case where the network device 20 is the SGW 310 will be described. The SGW 310 counts the number of switching times on the basis of the number of times an end marker indicating the last forwarding data has been transmitted to the first communication system. Alternatively, the SGW 310 counts the number of the switching times on the basis of a forward request of forwarding data (for example, "Forward Relocation Request") received from the first communication system. Note that, a method of counting the number of successful reception times is the same as that in the first embodiment. Thus, description thereof is omitted.

Note that, the SGW 310 transmits direct data to the first communication system before the switching from the first communication system to the second communication system, and transmits direct data to the second communication system after the switching from the first communication system to the second communication system.

(2) eNB 210 to SGSN 130 and then to RNC 120

In such case, the network device 20 described above is a RNC 120 or a SGSN 130. Since a case where the network device 20 is the RNC 120 is the same as the case of the first embodiment, description thereof is omitted.

A case where the network device 20 is the SGSN 130 will be described. The SGSN 130 counts the number of switching times on the basis of the number of transmission times of requests for switching from the first communication system to the second communication system. Note that, a method of counting the number of successful reception times is the same as that in the first embodiment. Thus, description thereof is omitted.

Note that, the SGSN 130 transmits direct data to the second communication system after the switching from the first communication system to the second communication system, and forwards forwarding data received from the first communication system, to the second communication system after the switching from the first communication system to the second communication system.

(3) eNB 210 to RNC 120

In such case, the network device 20 described above is a RNC 120. Since a case where the network device 20 is the RNC 120 is the same as the case of the first embodiment, description thereof is omitted.

[Modification 2]

Modification 2 of the first embodiment will be described below with reference to the drawings. Differences from the first embodiment will be mainly described below.

In the first embodiment, an example has been given of the operation of the RNC 120 when switching from LTE to UMTS is performed. Operations of network devices when switching from UMTS to LTE is performed will be described for each of forwarding paths of forwarding data. In other words, a description is given of a case where a first communication system is UMTS and a second communication system is LTE.

(1) RNC 120 to SGW 310 and then to eNB 210

In such case, the network device 20 described above is eNB 210 or a SGW 310. Since a case where the network device 20 is the SGW 310 is the same as the case of Modification 1, description thereof is omitted.

In a case where the network device 20 is the eNB 210, the eNB 210 counts the number of switching times on the basis of the number of times an end marker indicating the last forwarding data has been transmitted to the first communication system. Alternatively, the SGW 310 counts the number of the switching times on the basis of a request for switching from the first communication system to the second communication system (for example, "Handover Request"), the request for switching received from the core network device. Alternatively, the eNB 210 counts the number of the switching times on the basis of a completion of switching from the first communication system to the second communication system (for example, "Handover to E-UTRAN Complete"), the completion of switching received from the UE 10. Note that, a method of counting the number of successful reception times is the same as that in the first embodiment. Thus, description thereof is omitted.

(2) RNC 120 to SGSN 130 and then to eNB 210

In such case, the network device 20 described above is eNB 210. Since a case where the network device 20 is the eNB 210 is the same as the above-mentioned case (1), description thereof is omitted.

(3) RNC 120 to eNB 210

In such case, the network device 20 described above is eNB 210. Since a case where the network device 20 is the eNB 210 is the same as the above-mentioned case (1), description thereof is omitted.

Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation technologies will be easily found by those skilled in the art.

In the embodiment described above, the first communication system is a communication system complying with UMTS and a second communication system is a communication system complying with LTE. However, the embodiment is not limited to this configuration. Specifically, each of the first communication system and the second communication system is not limited to the communication system complying with UMTS or LTE, and may be a different communication system (for example, communication system complying with WiMAX).

In the embodiment described above, a detailed description of procedures of the Inter-RAT handover has been omitted. The procedures of the Inter-RAT handover are known procedures (for example, 3GPP TS23.401 v9.0.0 Subclause 5.5.2 "Inter RAT handover").

What is claimed is:

1. A mobile communication system having a first communication system and a second communication system configured to forward forwarding data from the first communication system to the second communication system when switching from the first communication system to the second communication system is determined, the forwarding data being a data that the first communication system has already received from a core network device, wherein
a network device transmitting direct data to a mobile communication terminal via the second communication system is configured to count a number of the switching from the first communication system to the second communication system for mobile communication terminals,
the network device is configured to count a number of successful reception of information identifying mobile communication terminals via a forwarding path of the forwarding data, and
the network device is configured to judge whether the forwarding path of the forwarding data is normal on the basis of a ratio between the number of switching and the number of successful reception.

2. The mobile communication system according to claim 1, wherein
the network device is a device which controls a radio resource in the second communication system, and
the network device is configured to count the number of switching on the basis of the requests for switching from the first communication system to the second communication system or on the basis of a completion of switching from the first communication system to the second communication system, the request for switching being received from the core network device, the completion of switching being received from a mobile communication terminal.

3. The mobile communication system according to claim 1, wherein
the network device is the core network device,
the network device is configured to transmit the direct data to the first communication system before the switching from the first communication system to the second communication system,
the network device is configured to transmit the direct data to the second communication system after the switching from the first communication system to the second communication system, and
the network device is configured to count the number of switching on the basis of number of times an end marker indicating the last forwarding data has been transmitted to the first communication system.

4. The mobile communication system according to claim 1, wherein
the network device is the core network device,
the network device is configured to transmit the direct data to the second communication system after the switching from the first communication system to the second communication system,
the network device is configured to forward the forwarding data received from the first communication system, to the second communication system after the switching from the first communication system to the second communication system, and
the network device is configured to count the number of switching on the basis of a forward request of the forwarding data received from the first communication system.

5. A network device provided in a mobile communication system having a first communication system and a second communication system configured to forward forwarding data from the first communication system to the second communication system when switching from the first communication system to the second communication system is determined, the forwarding data being a data that the first communication system has already received from a core network device;
the network device transmitting direct data to a mobile communication terminal via the second communication system comprising:
a switching time counter configured to count a number of the switching from the first communication system to the second communication system for mobile communication terminals;
a successful reception time counter configured to count a number of successful reception of information identifying mobile communication terminals via a forwarding path of the forwarding data; and
a controller configured to judge whether the forwarding path of the forwarding data is normal on the basis of a ratio between the number of switching and the number of successful reception.

6. A mobile communication method used in a mobile communication system having a first communication system and a second communication system configured to forward forwarding data from the first communication system to the second communication system when switching from the first communication system to the second communication system is determined, the forwarding data being a data that the first communication system has already received from a core network device, the mobile communication method comprising the steps of:
counting, by a network device transmitting direct data to a mobile communication terminal via the second communication system, a number of the switching from the first communication system to the second communication system for mobile communication terminals;
counting, by the network device, a number of successful reception of information identifying mobile communication terminals via a forwarding path of the forwarding data; and
judging, by the network device, whether the forwarding path of the forwarding data is normal on the basis of a ratio between the number of switching and the number of successful reception.

* * * * *